United States Patent [19]

Kitabatake et al.

[11] Patent Number: 4,666,361
[45] Date of Patent: May 19, 1987

[54] ARM DRIVING APPARATUS

[75] Inventors: Shoichi Kitabatake, Ohira; Yuhiko Yabe, Kasukabe; Kazuhiko Ami, Utsunomiya, all of Japan

[73] Assignee: Hitachi, Ltd., Tokyo, Japan

[21] Appl. No.: 708,864

[22] Filed: Mar. 6, 1985

[30] Foreign Application Priority Data

Mar. 7, 1984 [JP] Japan ................................ 59-42006

[51] Int. Cl.⁴ ............................................ B25J 19/06
[52] U.S. Cl. ..................................... 414/680; 901/21; 901/25; 901/49
[58] Field of Search ........... 414/719, 680, 735, 744 A; 901/15, 21, 25, 48, 49

[56] References Cited

U.S. PATENT DOCUMENTS 4,398,720 8/1983 Jones et al. ........................ 901/21 X
4,547,121 10/1985 Nesmith ............................ 901/25 X Primary Examiner—Robert J. Spar
Assistant Examiner—Donald W. Underwood
Attorney, Agent, or Firm—Antonelli, Terry & Wands

[57] ABSTRACT

An arm driving apparatus for an articulated robot, which is equipped with a worm wheel adapted to move the arm, a worm gear for driving the worm wheel, and a drive motor for driving the worm gear.

2 Claims, 3 Drawing Figures

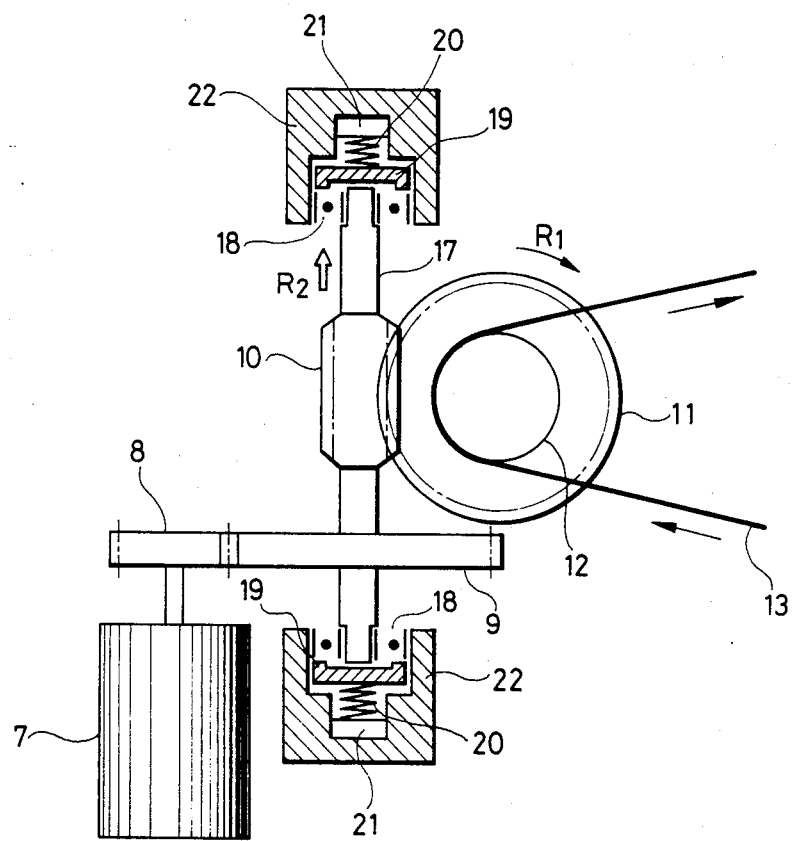

ARM DRIVING APPARATUS

BACKGROUND OF THE INVENTION

The present invention relates to a driving apparatus and, more particularly, to an arm driving apparatus for a vertical multi-articulated robot.

Multi-articulated robots have been proposed and a number of arm driving apparatus have also been proposed wherein the first and second arms as well as the associated wrist and/or fingers are provided with search elements being naturally subjected to gravitational forces thereby resulting in the necessity of providing a brake such as, for example, an electromagnetic brake, for stopping the action of the multi-articulated robot. Furthermore, in the proposed robots, mounting of a pressure sensor for detecting forces applied to the fingers of the robot is extremely difficult since there is not suitable installation space for the pressure sensor.

An object of the present invention is to prevent the arms of a vertical multi-articulated robot, for example, when this robot is to be stopped, from being shifted from a target stop (or vertical) position by the weight of a load.

Another object of the present invention is to detect that an extraordinary load is applied to the arms of the robot.

In order to achieve the above-specified objects, in accordance with the present invention, a worm gear and a worm wheel are used in an arm driving apparatus, with an extraordinary load being detected by pressure sensors attached to the opposite ends of a worm gear shaft.

BRIEF DESCRIPTION OF THE DRAWINGS

FIG. 3 is an explanatory partial cross-sectional view of a portion of an arm driving apparatus according to another embodiment of the present invention.

DETAILED DESCRIPTION

Figure 1:
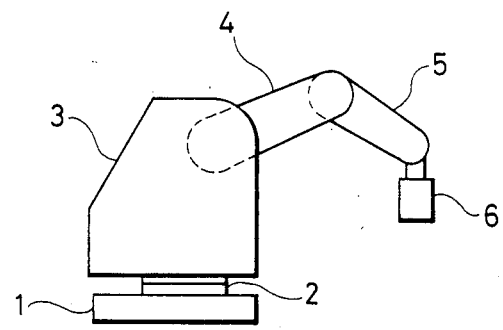
FIG. 1 is a schematic view showing the vertical multi-articulated robot of the prior art.

Referring now to the drawings wherein like reference numerals are used throughout the various views to designate like parts and, more particularly, to FIG. 1, according to this figure, a prior art vertical multi-articulated robot includes, for example, a pedestal 1, a swivel or pivot means 2, a body 3, a first arm 4, a second arm 5, and a wrist 6 functioning to grasp a load (not shown).

With a vertical multi-articulated robot of the type illustrated in FIG. 1, the first arm 4, second arm 5, and wrist 6 are naturally dropped or subjected to gravitational forces if no braking means are provided for controlling the positioning of the arms and wrist when the robot is stopped.

Figure 2:
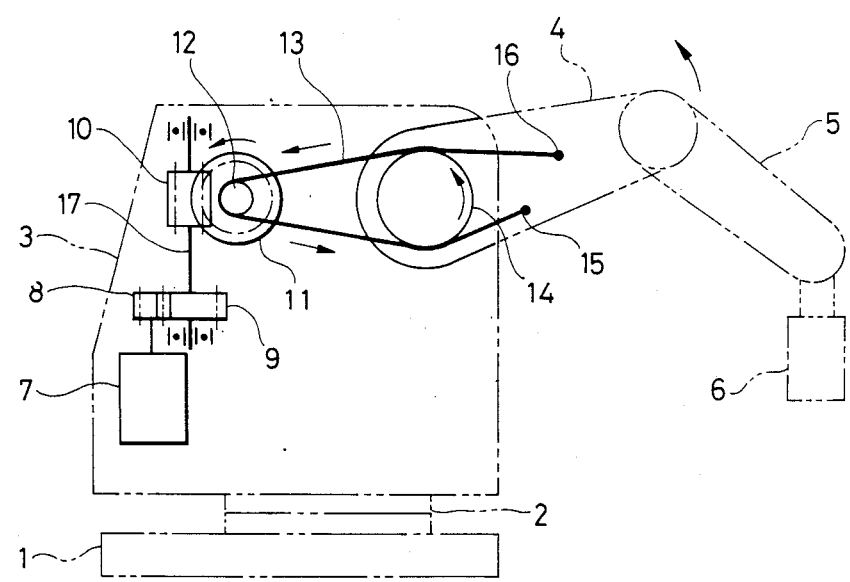
FIG. 2 is a schematic view of an arm driving apparatus according to one embodiment of the present invention.

In accordance with the present invention, as shown most clearly in FIG. 2, the multi-articulated robot includes a drive motor 7, spur gears 8, 9, a worm gear 10, a worm wheel 11, a power transmission drive wheel 12 concentrically fixed in the worm wheel 11, with a power transmission wire 13 for driving the first arm, a pulley for driving the first arm, a wire retainer 15, and a wire tension adjuster 16.

The drive of the first arm 4 resulting from a rotation of an output shaft (not shown) of the drive motor 7 is decelerated by the spur gears 8, 9 and a coaction between the worm gear 10, connected to the spur gear 9 through a worm gear shaft 17, and the worm wheel 11. The power transmission drive wheel 12, which is made integral with and concentric to the worm wheel 11, pulls in its turning direction, as indicated by arrow in FIG. 2, the wire 13 which has its one end retained. As a result, the pulley 14, carried on the first arm 4 can be turned to move the first arm 4 and, as can be appreciated, this motion can be reversed if the rotation of the drive motor 7 is reversed.

When the motions of the arms of the vertical multi-articulated robot are to be interrupted, the turning force, generated by the effects of gravity due to the weight of the first arm 4, the second arm 5 and the wrist 6 and applied to the worm wheel 11, is reduced. This is because the worm gear 10 and the worm wheel 11, in engagement with each other, provide a high reduction ratio are employed so that the load is applied generally perpendicularly to the worm gear 10 so as to minimize the force for turning the worm gear 10. As a result, the gear 10 and the worm wheel 11 establish a strong contacting frictional force to act as a locking device so that the worm gear 10 is prevented from rotation. Thus, upon the interruption, the arms 4, 5 are prevented from dropping by the effects of gravity so that the vertical positions of the arms 4, 5 and wrist 6 can be maintained without fail.

As shown in FIG. 3, a pair of thrust-radial bearings are fixed on the two leading ends of the shaft 17, with a pair of jigs 19, movable with the bearings 18 moving in synchronism with the vertical movements of the shaft 17. A pair of pressure sensors 21 are provided along with a pair of springs 20 between the respectively interposed jigs 19 and the pressure sensors 21, for biasing the bearings 18 and for transmitting the forces to the pressure sensors 21. A pair of housings 22 are fixed on the body 3 for respectively accommodating the bearings 18 and the pressure sensors 21.

When the worm wheel 11 is turned in the direction of arrow $R_1$ in the driving apparatus thus constructed, a thrust $R_2$ is applied from the shaft 17 to the bearing 18 and transmitted through both jigs 19, which is made movable vertically in the housing 22 together with the bearing 18, and the spring 20 to the pressure sensor 21 so that it can be detected. If the worm wheel 11 is turned in the opposite direction, a reverse thrust can be detected by the pressure sensor 21 located at the lower end. When the arms 4, 5 collide to establish an extraordinary load a strong thrust is generated at the bearing 18 of the upper or lower end of the shaft 17 but can be likewise detected by the corresponding pressure sensor 21. Thus, if such stronger thrust than that of the normal run is detected, the robot can be subjected to an emergency stop. When the robot is stopped, the worm gear is prevented from any turn by the force applied to the arms 4, 5, as has been described above. Then, the force applied to the arms is mostly converted into that in the thrusting direction of the worm gear 10 so that it can be detected by the corresponding pressure sensor 21.

As has been described hereinbefore, according to the present invention, the arms 4, 5 can be prevented from dropping due to forces of gravity and can be reliably maintained in vertical positions at a reasonable cost and with ease. Since the pressure sensors are disposed at the opposite ends of the shaft of the worm gear, the forces applied to the arms can be conveniently detected, and the extraordinary load can be detected to ensure an emergency stop.

What is claimed is:

1. An arm driving apparatus comprising: a drive motor; a worm gear adapted to be rotated by an output of said drive motor; a worm wheel engaging with said worm gear; transmission means for transmitting a turning force of said worm wheel; an arm adapted to be moved up and down by said transmission means; and a pair of pressure sensors disposed at respective ends of a shaft of said worm gear for detecting a thrust of said shaft.

2. An arm driving apparatus according to claim 1, wherein said transmission means includes a pulley carried on said arm; and a wire extending between said pulley and said worm wheel.

* * * * *